United States Patent
Bockus et al.

(10) Patent No.: US 8,776,096 B2
(45) Date of Patent: Jul. 8, 2014

(54) METHODS FOR OPERATING SYSTEM IDENTIFICATION AND WEB APPLICATION EXECUTION

(75) Inventors: Michael A. Bockus, Austin, TX (US); Jacob D. Henderson, Austin, TX (US); Kevin R. Sawicki, Austin, TX (US); John P. Keane, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/460,584

(22) Filed: Apr. 30, 2012

(65) Prior Publication Data

US 2012/0216218 A1 Aug. 23, 2012

Related U.S. Application Data

(63) Continuation of application No. 12/484,085, filed on Jun. 12, 2009, now abandoned.

(51) Int. Cl.
*G06F 9/44* (2006.01)
*G06F 15/163* (2006.01)

(52) U.S. Cl.
USPC .......................................... 719/330; 709/206

(58) Field of Classification Search
None
See application file for complete search history.

(56) References Cited

U.S. PATENT DOCUMENTS

| | | | |
|---|---|---|---|
| 5,898,835 A | 4/1999 | Truong | |
| 5,901,319 A | 5/1999 | Hirst | |
| 6,065,043 A | 5/2000 | Domenikos et al. | |
| 6,681,212 B1 | 1/2004 | Zeng | |
| 6,725,451 B1 | 4/2004 | Schuetz et al. | |
| 6,807,606 B2 | 10/2004 | Copeland et al. | |
| 2002/0083216 A1 | 6/2002 | Hickson et al. | |
| 2002/0170039 A1 | 11/2002 | Kovacevic | |
| 2002/0191018 A1 | 12/2002 | Broussard | |
| 2003/0217188 A1* | 11/2003 | Kung et al. | 709/310 |
| 2004/0019643 A1* | 1/2004 | Zirnstein, Jr. | 709/206 |
| 2006/0031833 A1* | 2/2006 | Huang et al. | 717/178 |
| 2007/0168728 A1 | 7/2007 | Blouin et al. | |
| 2008/0256564 A1 | 10/2008 | Fathalla | |
| 2009/0106456 A1* | 4/2009 | Muller et al. | 710/5 |
| 2010/0319010 A1 | 12/2010 | Bockus et al. | |

FOREIGN PATENT DOCUMENTS

| | | |
|---|---|---|
| WO | 2004104827 A2 | 12/2004 |
| WO | 2006010263 A1 | 2/2006 |

OTHER PUBLICATIONS

International Search Report for Application No. PCT/EP2010/058230 mailed Aug. 25, 2010, 4 pages.

* cited by examiner

*Primary Examiner* — Andy Ho
*Assistant Examiner* — Abdou Seye
(74) *Attorney, Agent, or Firm* — Toler Law Group, PC

(57) ABSTRACT

Methods to execute operating system dependencies for web applications are provided. A particular method includes receiving an operating system independent function call at a web server. The operating system independent function call may be initiated at a web-based application. The method further includes determining a particular operating system used by the web server and selecting a command based on the particular operating system. The method further includes executing the selected command.

36 Claims, 3 Drawing Sheets

METHODS FOR OPERATING SYSTEM IDENTIFICATION AND WEB APPLICATION EXECUTION

I. CLAIM OF PRIORITY

This application is a continuation patent application of, and claims priority from, U.S. patent application Ser. No. 12/484,085 filed on Jun. 12, 2009 and entitled "Systems and Methods for Operating System Identification and Web Application Execution," status abandoned, which is incorporated by reference herein in its entirety for all purposes.

II. FIELD

The present disclosure is generally related to networked computing systems, and more particularly, to web application execution.

III. DESCRIPTION OF RELATED ART

Web applications may rely upon functions that use instructions that, in turn, depend upon a particular operating system of a computing system on which the web application is executing. Certain web applications, as a result, include code to execute a series of tests in order to determine the type of operating system on which the web application may execute. The web application may be modified if there is a need or desire to execute the web application on a different computing system having a different operating system. Modifying web applications for different operating system environments adds costs to development.

IV. BRIEF SUMMARY

Methods to execute web applications are provided. A particular method includes receiving an operating system independent function call at a web server from a web-based application. The method further includes determining a particular operating system used by the web server and selecting a command based on the particular operating system. The method further includes executing the selected command associated with the operating system independent function call at the web server.

V. BRIEF DESCRIPTION OF THE DRAWINGS

VI. DETAILED DESCRIPTION

Figure 1:
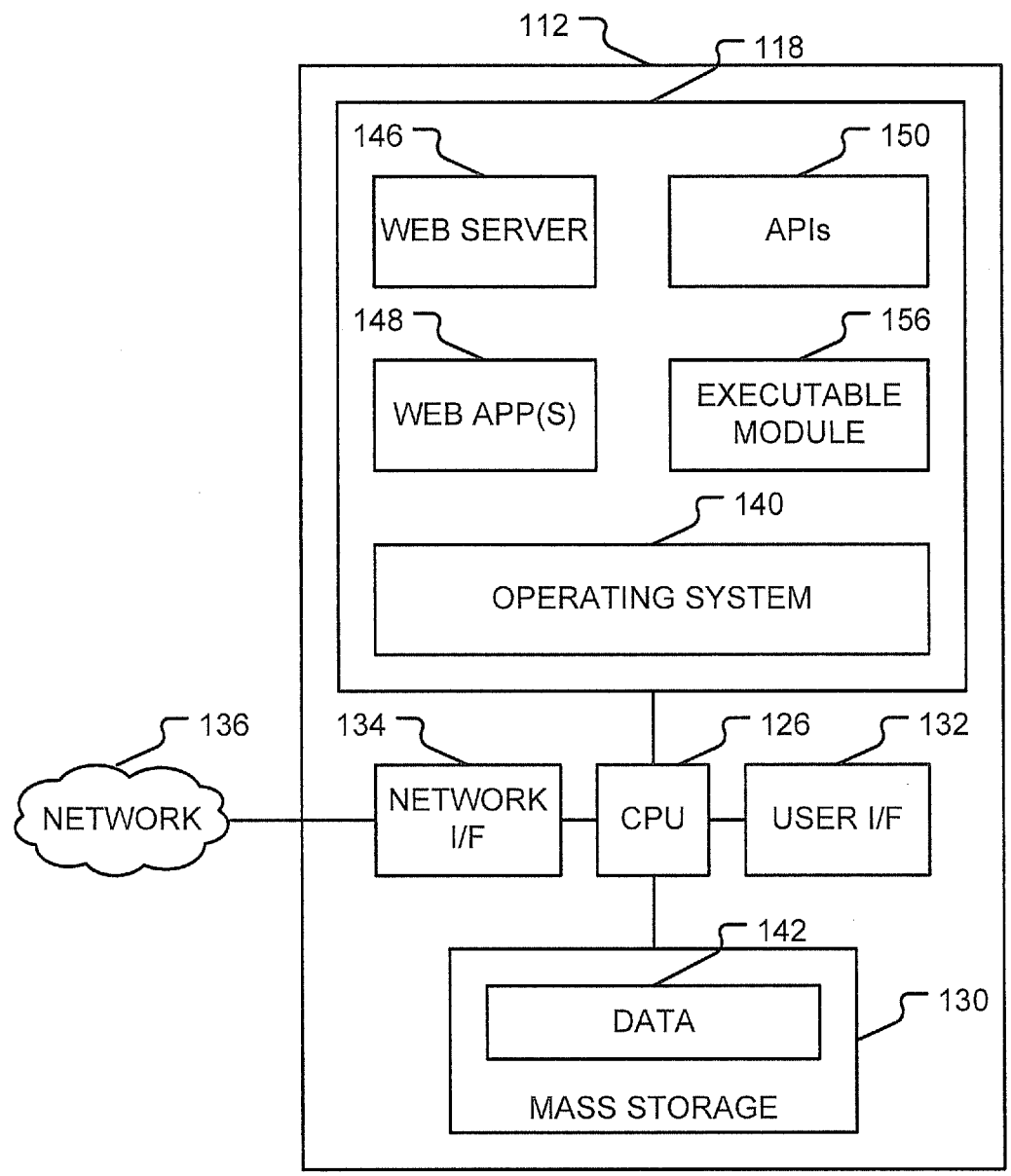
FIG. 1 is a block diagram of an illustrative computer system configured to execute a web application.

FIG. 1 illustrates a computing apparatus, such as a client-server based computer system 100 configured to execute web applications. In one aspect, the computer system 100 may provide web developers with an interface to retrieve a path to an executable web application without necessitating extra code to determine the operating system on which the web application is executing. Instead, a web server 146 may execute an identify command to transparently determine an operating system that is being used. The web server 146 may further provide the correct path to any required executables based on a set of parameters provided by the developers.

The system 100 of FIG. 1 is configured to determine a path to an executable by determining the type of operating system being executed by the system 100. The system 100 includes at least one computer 112. The computer 112 shown in FIG. 1 may represent any type of computer, computer system or other programmable electronic device capable of functioning as a client or a server in a client-server environment. Moreover, the computer 112 may be implemented using one or more networked computers, e.g., in a cluster or other distributed computing system.

The computer 112 includes a central processing unit (CPU) 126 that includes at least one microprocessor coupled to a memory 118. The memory 118 may include an operating system 140. The computer 112 generally operates under the control of the operating system 140. The operating system 140 may generally function as an interface between hardware and applications. The operating system 140 may be responsible for the management and coordination of activities and the sharing of computer resources.

The operating system 140 additionally may act as a host for applications that execute on the computer 112. As a host, the operating system 140 may manage details of the application as related to the operation of the hardware. Applications, such as web applications 148, may access operating system services through application programming interfaces (APIs) 150 or system calls. By invoking an API 150, the application may request a service from the operating system 140, pass parameters, and receive any results of an operation. Users may also interact with the operating system 140 using a software user interface, such as a command line interface or a graphical user interface.

The memory 118 may also include various computer software applications, components, programs, objects, modules, data structures, etc, that are executable by the CPU 126. For example, a web server 146 may include a program that accepts HTTP requests from clients, e.g., a web browser, and serves responses that typically include web pages, such as HTML documents and linked objects. The web server 146 may identify the operating system 140 being executed by the computer 112. The web server 146 may identify the operating system 140 in response to an operating system independent function call initiated at a web application 148. For example, a web application 148 may initiate an operating system independent call querying sales data. In response to the sales data query, an exemplary web server 146 may execute an identify command, e.g., a Java command including "System.getProperty ("os.name")". The indentify command may be configured to retrieve information identifying the operating system used by the web server 146.

In an embodiment, the web server 146 may include an executable module 156. The executable module 156 may include executables that execute an identify command to determine the operating system type. For example, the executable module 156 may receive the operating system independent function call prompting a display of employee address information. The executable module 156 may execute an identify command to determine the operating system type. The executable module 156 may further execute an operating system dependent command that is based on the operating system type and that initiates the display of employee address information.

The memory 118 may represent random access memory (RAM) devices comprising main storage of the computer 112, as well as any supplemental levels of memory, e.g., cache memories, non-volatile or backup memories (e.g., programmable or flash memories), read-only memories, etc. In addition, the memory 118 may include memory storage physically located elsewhere in the computer 112, e.g., cache memory in CPU 126, as well as any storage capacity used as a virtual memory, e.g., as stored on a mass storage device 130 or on another computer coupled to the computer 112 via a network 136. The computer 112 may receive and output data via a user interface 132.

The embodiment of FIG. 1 may reduce the number of tests used to determine the operating system. The web application may be modified to enable execution by the determined operating system at any time without rebuilding the source code. The embodiment of FIG. 1 may further provide web developers with a direct path to an executable web application that includes codes appropriate for the operating system being executed by the web server. The appropriate code, e.g., command string, may be determined and retrieved without necessitating extra software at the web application to determine the operating system on which the web application is executing. Instead, the web server 146 may transparently determine the operating system that is being used in response to an operating system independent function call. The web server 146 may provide the correct path to a version of code appropriate for the executing operating system. For example, an appropriate version of installation code may be selected from among a number of versions of installation programs, each version associated with a different operating system.

Figure 2:
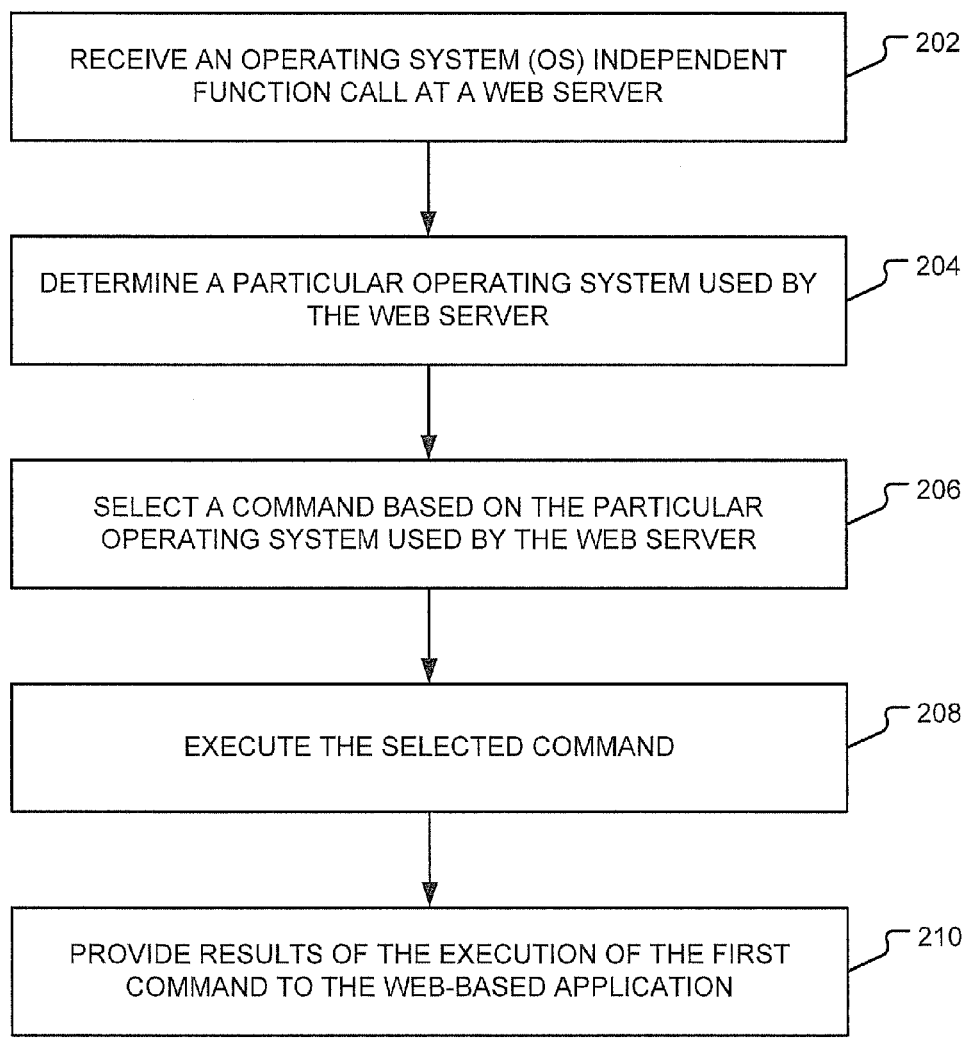
FIG. 2 is a flowchart showing processes executable by the system of FIG. 1 to execute a web application.

Referring to FIG. 2, a method is described that includes receiving an operating system independent function call at a web server from a web-based application, at 202. By way of example, a web-based application may be designed to list the user accounts on the server. According to one embodiment, the web-based application may be programmed to provide an operating system independent function call. For example, in a Java Websphere environment, the web-based application could utilize the provided method signature:

public.java.lang.String getExecutable (java.lang.String command ID)

In another example, an application web.xml file may be provided as follows:

```
<executable commandId="LISTUSER">
    <command ostype="Linux">cat /etc/passwd | cut -d: -f1</command>
    <command ostype="AIX">lsuser -c -a id home ALL | sed '/ #.*/d' |
    tr ':'\011'</command>
</executable>
```

Responsive to receiving the operating system independent function call, a determination may be made as to the particular operating system used by the web server, at 204. The method used by the web server to determine the operating system being used may vary by system. As an example, a Java 2 Platform, Enterprise Edition (J2EE) server may use a Java System property "os.name". The J2EE server may use an identify command that include a Java method, such as System.getProperty ("os.name"), to retrieve the operating system identification information.

Thus, in the exemplary system using a Java Websphere application executing on a J2EE platform, the web based application may be programmed to send the command "LISTUSER" to a web server. Responsive to receiving the command "LISTUSER", a determination may be made at the web server of the particular operating system being used, e.g., by executing the System.getProperty ("os.name") command. A method signature "public java.lang.String getExecutable (java.lang.String commandId)" may take the command (e.g., LISTUSER) attribute of the executable element as a parameter.

A command may be selected in response to the operating system independent function call and based on the particular operating system used by the web server 206. For example, the independent function call from the web application may initiate a determination by the web server of the operating system being executed by the web server. The command may include a version of installation code for the web application that is appropriate for the determined operating system. The web server 206 may provide a command string for AIX or Linux, for instance. Where the operating system is unsupported, a null value may alternatively be returned. In this manner, a command may be selected based on the operating system independent function and based on the particular operating system being used.

The command may be executed to access and implement the function associated with the operating system independent function call, at 208. For example, the command string for AIX or Linux may be executed by a respective AIX or Linux operating system to execute a function to, for example, list user accounts on the system.

In a particular embodiment, results of execution of the command may be provided to the web based application 210. In one particular example, only two operating systems (e.g., AIX and Linux) may be supported. Additional operating systems may be supported in other embodiments. For example, the following additional Java-supported operating systems may be used with certain embodiments: Digital Unix; FreeBSD; HP UX; Irix; Mac OS; MPE/iX; Netware 4.11; OS/2; Solaris; Windows 2000; Windows 95; Windows 98; Windows NT; and Windows XP.

The executable module 156 may be separate from and may operate independently with respect to the web-based application, allowing support for additional operating systems (whether currently supported by Java or supported in the future) to be added without the need to alter or rebuild the software for the web-based application. Rather, additional <command> elements may be added to the web.xml configuration file with corresponding operating system identifiers and commands.

The commands may access a function of the particular operating system. Continuing with the earlier example, one function may be to list the user accounts on the server. However, any number of functions may be accessed using the described techniques. In certain cases, a command may provide for including data necessary to execute the function. Data may be provided as part of the operating system independent function call and passed to the web server, such as the example of using the web.xml configuration file.

The embodiment of FIG. 2 may reduce the number of tests used to determine the operating system. The web server 146 may be used to determine the operating system being executed by the web server 146. The web application may be modified to enable execution by the determined operating system at any time without rebuilding the source code of the web application. The appropriate code, e.g., command string, may be determined and retrieved without necessitating extra web application software to determine the operating system on which the web application is executing. Instead, the web server 146 may transparently determine the operating system that is being used in response to an operating system independent function call. The web server 146 may provide the correct path to a version of code appropriate for executing the requested function at the executing operating system.

Figure 3:
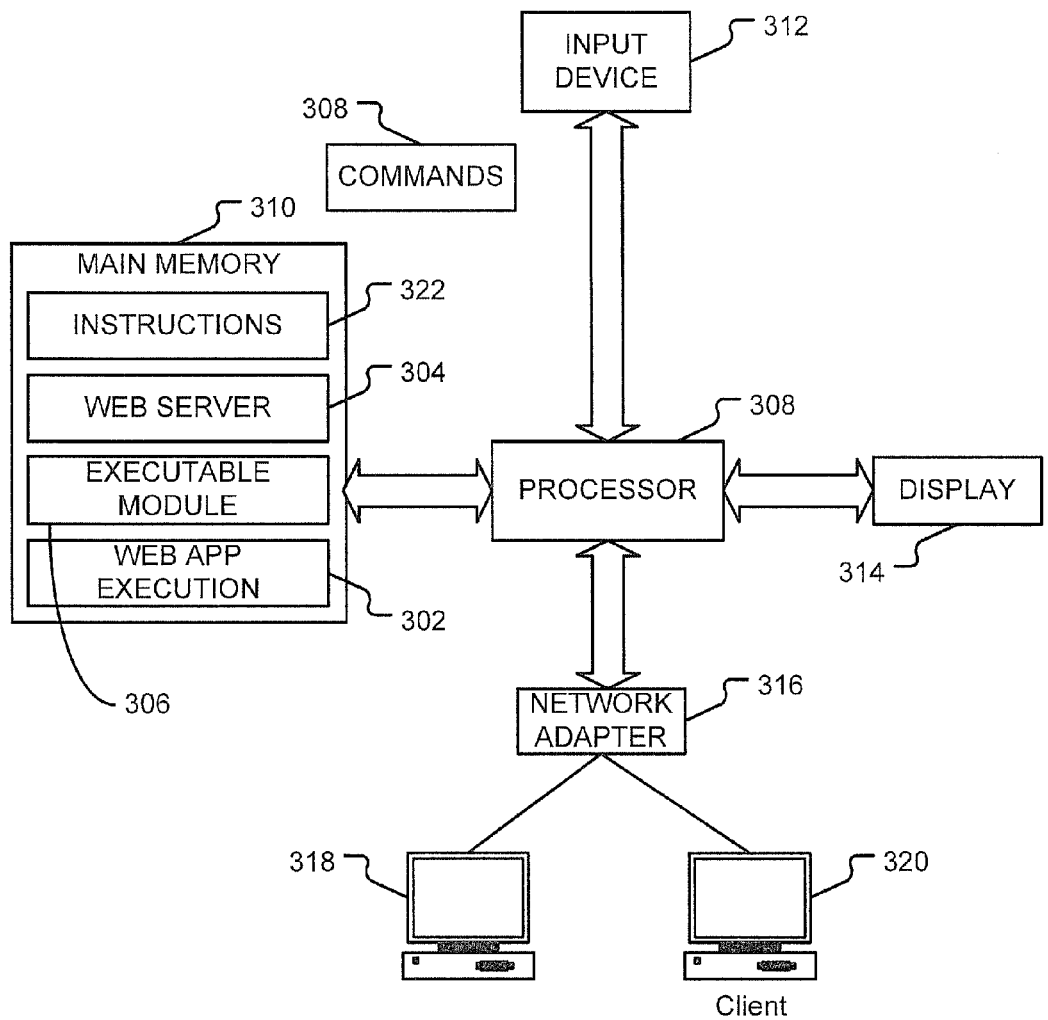
FIG. 3 is a block diagram of another illustrative computer system configured to execute a web application.

FIG. 3 is a block diagram of a computing system configured to execute the method of FIG. 2 to execute a web application. Computing system 300 includes webapp execution program 302, a web server 304, and an executable module 306 for executing a web application in a networked environment.

In the depicted example, the computing system 300 includes a processor 308, a main memory 310, an input device 312, such as a keyboard or mouse, a display device 314, and a network adapter 316. The network adapter 316 is coupled to client computers 318, 320.

The main memory 310 may include computer instructions 322 installed onto a computer readable medium, such as computer memory storage. The main memory 310 may include the computer instructions 322 executable by the processor 308. The computer instructions 322 may include an operating system independent function call. As an example, the operating system independent function call may be the LISTUSER function described above, but may also be any number of other functions as may be useful for implementation with a particular web-based application. The computer instructions 322 may determine the operating system type of the server and may execute an operating system dependent command selected from a plurality of commands 324.

The operating system dependent command may be selected based on the operating system type and in response to the operating system independent function call of the instructions 322. For example, the operating system dependent command may include a version of installation code selected from a number of installation codes where each code is associated with a corresponding operating system. The selection may be automatically made based on the determination of the operating system being executed by the web server. The operating system determination may be made in response to receiving the operating system independent call.

The main memory 310 may also include the executable module 306, such as the executable module 156 described in reference to FIG. 1, to execute a command 324 to determine the operating system type. The executable module 306 may additionally execute an operating system dependent command. In one example, either a first operating system dependent command (e.g., for AIX) or a second operating system dependent command (e.g., for Linux) may be executed depending on the operating system type. Additional operating system dependent commands may be added and made accessible to the main memory 310 for other operating systems.

An operating system (not shown) runs on the processor 308 and coordinates and provides control of various components within the computing system 300. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 300 (Java and all Java-based trademarks are trademarks of Sun Microsystems, Inc. in the United States, other countries, or both).

The hardware in computing system 300 may vary depending on the implementation. Other internal hardware or peripheral devices, such as flash memory, equivalent non-volatile memory, or optical disk drives and the like, may be used by the computing system 300 but are not specifically illustrated in FIG. 3 to simplify the explanation. Also, the processes of the disclosed illustrative embodiments may be applied to a multiprocessor data processing system.

The depicted examples described with respect to FIG. 3 are not meant to imply architectural limitations. For example, portions of the computing system 300 may be implemented in a personal computer, a server, a server cluster, a tablet computer, a laptop computer, or a communication device.

Particular embodiments of the computing system 300 can take the form of an entirely hardware embodiment, an entirely software embodiment or an embodiment containing both hardware and software elements. In a particular embodiment, the disclosed methods are implemented in software that is embedded in a processor readable medium and executed by a processor (including but not limited to firmware, resident software, microcode, etc).

Further, embodiments of the present disclosure, such as the one or more embodiments in FIGS. 1-3, can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, or communicate the program, or portions thereof, for use by or in connection with the computer, the instruction execution system, an apparatus, or a computing device.

In various embodiments, the medium can include an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write memory (CD-R/W) and digital versatile disk (DVD).

The previous description of the disclosed embodiments is provided to enable a person skilled in the art to make or use the disclosed embodiments. Various modifications to these embodiments will be readily apparent to those skilled in the art, and the generic principles disclosed herein may be applied to other embodiments without departing from the scope of the disclosure. Thus, the present disclosure is not intended to be limited to the embodiments shown herein, but is to be accorded the widest scope possible consistent with the principles and features as defined by the following claims.

What is claimed is:

1. A method comprising:
    receiving an operating system independent function call at a web server, the function call initiated at a web-based application;
    determining a particular operating system used by the web server;
    identifying a plurality of executable commands in a configuration file to perform a function corresponding to the function call, wherein each executable command of the plurality of executable commands is executable within a particular type of operating system to perform the function, and wherein the particular type of operating system is one of a plurality of types of operating systems;
    selecting a command based on the particular operating system used by the web server, wherein the command is selected from the plurality of executable commands, and wherein the particular operating system is of a type that matches the particular type of operating system supported by the command;
    executing the command at the web server; and
    sending results of execution of the command to a computing device.

2. The method of claim 1, wherein the command is executed in response to selecting the command based on the particular operating system used by the web server.

3. The method of claim 1, wherein the command initiates a web function associated with the operating system independent function call.

4. The method of claim 1, wherein the command initiates a function of the operating system used by the web server.

5. The method of claim 1, wherein the command is further selected based on the operating system independent function call.

6. The method of claim 1, wherein determining the particular operating system further comprises initiating an identification command at the web server to determine the particular operating system used by the web server.

7. The method of claim 1, wherein the operating system independent function call includes data to execute the function.

8. The method of claim 1, wherein the command includes data to execute a particular function of the particular operating system, wherein the particular function is selected based on the operating system independent function call.

9. The method of claim 1, wherein selecting the command further comprises selecting a version of an installation program for the web application based on the particular operating system.

10. The method of claim 1, further comprising providing the results of execution of the command at the web server to the web-based application.

11. The method of claim 1, further comprising executing an executable module separate from the web-based application and in communication with the web server, wherein the executable module determines the particular operating system and selects the command based on the particular operating system.

12. The method of claim 1, wherein the web server identifies the particular operating system by executing an identify command.

13. The method of claim 12, wherein the web server is a Java server and the identify command is a Java system command.

14. A method comprising:
receiving, at a particular web server, a request to execute a function;
identifying a plurality of executable commands in a configuration file to perform the function, wherein each executable command of the plurality of executable commands is executable within a particular type of operating system to perform the function, wherein the particular type of operating system is one of a plurality of types of operating systems;
selecting a particular executable command from the plurality of executable commands based on an operating system of the particular web server, wherein the particular type of operating system that supports the particular executable command matches a type of the operating system of the particular web server;
executing the particular executable command at the particular web server; and
sending results of execution of the particular executable command to a computing device.

15. The method of claim 14, wherein the configuration file includes information associated with at least one executable command of the plurality of executable commands, the information indicating a version of the type of operating system.

16. The method of claim 14, further comprising:
receiving, at the particular web server, a second request to execute a second function;
identifying a second plurality of executable commands in the configuration file, wherein each executable command of the second plurality of executable commands is executable within a second particular type of operating system to perform the second function, wherein the second particular type of operating system is one of a second plurality of types of operating systems;
selecting a second particular executable command from the second plurality of executable commands based on the operating system of the particular web server, wherein the second particular type of operating system that supports the second particular executable command matches the type of the operating system of the particular web server;
executing, in response to selecting the second particular executable command, the second particular executable command at the particular web server; and
sending results of execution of the second particular executable command to the computing device.

17. A system comprising:
a processor; and
a memory accessible to the processor, wherein the memory includes instructions that, when executed by the processor, cause the processor to:
responsive to a particular server receiving a request to execute a function, identify a plurality of executable commands in a configuration file to perform the function, wherein each executable command of the plurality of executable commands is executable within a particular type of operating system to perform the function, wherein the particular type of operating system is one of a plurality of types of operating systems;
select a particular executable command from the plurality of executable commands based on an operating system of the particular server, wherein a type of the operating system matches the particular type of operating system supported by the executable command; and
in response to selection of the particular executable command from the plurality of executable commands based on the operating system of the particular server, execute the particular executable command.

18. The system of claim 17, wherein the processor and the memory are included in the particular server.

19. The system of claim 17, wherein the particular executable command is an operating system-specific command.

20. The system of claim 17, wherein the particular server is a web server.

21. The system of claim 17, wherein the particular executable command identifies a location of a program, wherein execution of the particular executable command causes the program to be executed at the particular server.

22. The system of claim 17, wherein the configuration file is stored in a particular memory of the particular server.

23. The system of claim 17, wherein the memory further includes instructions that, when executed by, cause the processor to determine the particular type of operating system to execute the particular executable command.

24. The system of claim 17, wherein the particular type of operating system is determined based on operating system information associated with the particular executable command.

25. The system of claim 24, wherein the configuration file is in an XML format and wherein the operating system information is an attribute of an XML formatted tag that identifies the particular executable command.

26. The system of claim 17, wherein the configuration file includes information associated with at least one executable command of the plurality of executable commands, the information indicating a version of the type of operating system.

27. The system of claim 17, wherein the memory further includes instructions that, when executed, cause the processor to modify the configuration file to update at least one of the plurality of executable commands.

28. The system of claim 17, wherein the memory further includes instructions that, when executed, cause the processor to:
  responsive to the particular server receiving a second request to execute a second function, wherein the second function is distinct from the function:
    identify a second plurality of executable commands in the configuration file, wherein each executable command of the second plurality of executable commands is executable within a second particular type of operating system to perform the second function, wherein the second particular type of operating system is one of a second plurality of types of operating systems;
    select a second particular executable command from the second plurality of executable commands based on the operating system of the particular server, wherein the type of the operating system of the particular server matches the second particular type of operating system supported by the second particular executable command; and
    in response to selection of the second particular executable command from the second plurality of executable commands based on the operating system of the particular server, execute the second particular executable command.

29. The system of claim 28, wherein the memory further includes instructions that, when executed, cause the processor to:
  send results of execution of the particular executable command to a first computing device; and
  send results of execution of the second particular executable command to a second computing device.

30. A computer readable storage device comprising instructions that, when executed by a processor, cause the processor to:
  receive, at a particular server, a request to execute a function;
  identify a plurality of executable commands in a configuration file to perform the function, wherein each executable command of the plurality of executable commands is executable within a particular type of operating system to perform the function, wherein the particular type of operating system is one of a plurality of types of operating systems;
  select a particular executable command from the plurality of executable commands based on an operating system of the particular server, wherein a type of the operating system matches the particular type of operating system supported by the particular executable command; and
  in response to selection of the particular executable command from the plurality of executable commands based on the operating system of the particular server, execute the particular executable command.

31. The computer readable storage device of claim 30, further comprising instructions that, when executed by the processor, cause the processor to send results of execution of the particular executable command to a computing device.

32. The computer readable storage device of claim 30, wherein the processor is included in the particular server.

33. The computer readable storage device of claim 30, wherein the particular executable command indicates a location of a program, wherein execution of the particular executable command causes the program to be executed at the particular server.

34. The computer readable storage device of claim 30, wherein the configuration file is in an XML format.

35. The computer readable storage device of claim 30, wherein the processor determines the particular type of operating system that executes particular executable command.

36. The computer readable storage device of claim 35, wherein the particular type of operating system is determined based on operating system info nation associated with the particular executable command in the configuration file.

* * * * *